US010036287B2

(12) United States Patent
Koyama et al.

(10) Patent No.: US 10,036,287 B2
(45) Date of Patent: Jul. 31, 2018

(54) VALVE SEAT

(71) Applicant: TPR CO., LTD., Chiyoda-ku, Tokyo (JP)

(72) Inventors: Yoshio Koyama, Tokyo (JP); Shohtaroh Hara, Tokyo (JP)

(73) Assignee: TPR CO., LTD., Tokyo (JP)

( * ) Notice: Subject to any disclaimer, the term of this patent is extended or adjusted under 35 U.S.C. 154(b) by 92 days.

(21) Appl. No.: 15/219,594

(22) Filed: Jul. 26, 2016

(65) Prior Publication Data

US 2016/0333456 A1    Nov. 17, 2016

Related U.S. Application Data

(62) Division of application No. 14/916,251, filed as application No. PCT/JP2013/073895 on Sep. 5, 2013, now Pat. No. 9,556,761.

(51) Int. Cl.
*B22F 3/24* (2006.01)
*F01L 3/02* (2006.01)
(Continued)

(52) U.S. Cl.
CPC .............. *F01L 3/02* (2013.01); *B22F 1/0059* (2013.01); *B22F 5/008* (2013.01); *C21D 6/007* (2013.01);
(Continued)

(58) Field of Classification Search
None
See application file for complete search history.

(56) References Cited

U.S. PATENT DOCUMENTS 4,204,031 A    5/1980  Takemura et al.
5,666,632 A    9/1997  Maulik
(Continued)

FOREIGN PATENT DOCUMENTS

JP    04-057844 B2    9/1992
JP      07133705 A    5/1995
(Continued)

OTHER PUBLICATIONS

Chinese Notification of the First Office Action corresponding to Application No. 201380075195.X; dated Apr. 14, 2016, with English translation.
(Continued)

*Primary Examiner* — Jessee R Roe
*Assistant Examiner* — Ngoclan T Mai
(74) *Attorney, Agent, or Firm* — Cantor Colburn LLP (57) ABSTRACT

The valve seat includes an iron-based sintered alloy subjected to oxidation treatment, which is obtained by subjecting an iron-based sintered alloy including: 4 mass % to 15 mass % of Co particles; and hard particles each containing at least one compound of an intermetallic compound, a carbide, a silicide, a nitride, or a boride that has one or more kinds of elements selected from group 4a to 6a elements in a periodic table, and having a hardness of from 600 HV to 1,600 HV to oxidation treatment, and which has an oxide mainly including triiron tetraoxide ($Fe_3O_4$) and cobalt oxide (CoO) formed on a surface and in an interior of the iron-based sintered alloy. The iron-based sintered alloy subjected to oxidation treatment has an area ratio of the oxide of from 5% to 25% in a cross section thereof in a state prior to installation on the cylinder head.

6 Claims, 10 Drawing Sheets

(51) Int. Cl.
*B22F 1/00* (2006.01)
*C22C 30/00* (2006.01)
*C22C 38/02* (2006.01)
*C22C 38/52* (2006.01)
*C22C 38/58* (2006.01)
*C23C 8/10* (2006.01)
*B22F 5/00* (2006.01)
*C22C 33/02* (2006.01)
*C22C 1/10* (2006.01)
*C21D 6/00* (2006.01)
*C21D 9/00* (2006.01)
*C22C 32/00* (2006.01)
*C22C 38/10* (2006.01)
*C23C 8/14* (2006.01)

(52) U.S. Cl.
CPC .......... *C21D 9/0068* (2013.01); *C22C 1/1078* (2013.01); *C22C 30/00* (2013.01); *C22C 32/001* (2013.01); *C22C 33/02* (2013.01); *C22C 33/0257* (2013.01); *C22C 38/02* (2013.01); *C22C 38/10* (2013.01); *C22C 38/52* (2013.01); *C22C 38/58* (2013.01); *C23C 8/10* (2013.01); *C23C 8/14* (2013.01); *B22F 2301/15* (2013.01); *B22F 2301/35* (2013.01); *B22F 2302/10* (2013.01); *B22F 2302/25* (2013.01); *C22C 33/0207* (2013.01); *C22C 33/0285* (2013.01); *F01L 2101/00* (2013.01); *F01L 2101/02* (2013.01); *F01L 2103/00* (2013.01); *F01L 2820/01* (2013.01)

(56) References Cited

U.S. PATENT DOCUMENTS

| | | | |
|---|---|---|---|
| 6,139,598 | A | 10/2000 | Narasimhan et al. |
| 6,139,599 | A | 10/2000 | Takahashi et al. |
| 6,318,327 | B1 | 11/2001 | Takahashi et al. |
| 2003/0230164 | A1 | 12/2003 | Henmi et al. |
| 2004/0069094 | A1 | 4/2004 | Sato et al. |
| 2004/0187830 | A1 | 9/2004 | Sato et al. |
| 2004/0194576 | A1 | 10/2004 | Ando et al. |
| 2004/0194579 | A1 | 10/2004 | Ando et al. |
| 2007/0101964 | A1 | 5/2007 | Morimoto et al. |
| 2015/0047596 | A1 | 2/2015 | Koyama et al. |

FOREIGN PATENT DOCUMENTS

| | | |
|---|---|---|
| JP | 2004232088 A | 8/2004 |
| JP | 2013113220 A | 6/2013 |

OTHER PUBLICATIONS

International Search Report corresponding to Application No. PCT/JP2013/073895, dated Nov. 26, 2013, with English translation.

U.S. Non-Final Office Action corresponding to Application No. 14916251 dated May 20, 2016.

Extended European Search Report corresponding to Application No. 13892953.4; dated Dec. 5, 2016.

EP Office Action for corresponding Application No. 13892953.4-1373; dated Nov. 29, 2017.

| Co PARTICLES ADDED AMOUNT | OXYGEN MAP (×500) | AREA RATIO OF OXIDE |
|---|---|---|
| 0 MASS% |  | 10.5% |
| 4 MASS% |  | 10.1% |
| 8 MASS% |  | 10.0% |
| 12 MASS% |  | 9.8% |

VALVE SEAT

CROSS REFERENCE TO RELATED APPLICATIONS

The present application is a divisional application of U.S. patent application Ser. No. 14/916,251, filed on Mar. 3, 2016, now U.S. Pat. No. 9,556,761, the entire contents of which are incorporated herein by reference. The Ser. No. 14/916,251 application is the U.S. national stage of application No. PCT/JP2013/073895, filed on Sep. 5, 2013, the disclosure of which is incorporated herein by reference.

TECHNICAL FIELD

The present invention relates to a valve seat to be used in an internal combustion engine.

BACKGROUND ART

A valve seat is a part that serves as a seat of an air valve or an exhaust valve, the part being connected to the valve and needed for maintaining air-tightness of a combustion chamber.

A valve seat is required to have, for example, the following functions: (1) a function of maintaining air-tightness in order to prevent leakage of compressed gas or combustion gas into a manifold; (2) a heat-conducting function for allowing heat in the valve to escape toward the cylinder head; (3) sufficient strength to withstand impact on the valve during seating; and (4) a wear-resistance function minimizing wear even in high-heat and high-load environments.

Additional required characteristics of the valve seat include: (5) lacking aggressiveness to an associated valve; (6) having a reasonable cost; and (7) being easy to scrape during processing.

An iron-based sintered alloy therefore is used in the valve seat so as to satisfy the functions and characteristics stated above.

For example, Patent Literature 1 discloses a valve seat in which an oxide formed mainly of triiron tetraoxide is formed on a surface and in an interior of an iron-based sintered alloy through oxidation treatment, and an area ratio of the oxide formed mainly of triiron tetraoxide is from 5% to 20% in a cross section of the iron-based sintered alloy in a state prior to installation on a cylinder head.

CITATION LIST

Patent Literature

[PTL 1] JP 2013-113220 A

SUMMARY OF INVENTION

Technical Problem

In recent years, along with severer operation conditions of an internal combustion engine, a valve seat to be installed on a cylinder head of the internal combustion engine has been required to have higher wear resistance and higher radial crushing strength.

Accordingly, an object of the present invention is to provide a valve seat excellent in wear resistance and radial crushing strength.

Solution to Problem

The inventors of the present invention have made various investigations and found that a valve seat excellent in wear resistance and radial crushing strength is obtained by subjecting an iron-based sintered alloy including Co particles to oxidation treatment. Thus, the object has been achieved.

That is, according to one embodiment of the present invention, there is provided a valve seat to be installed on a cylinder head of an internal combustion engine, the valve seat including an iron-based sintered alloy subjected to oxidation treatment, which is obtained by subjecting an iron-based sintered alloy comprising: 4 mass % to 15 mass % of Co particles; and hard particles each containing at least one compound of an intermetallic compound, a carbide, a silicide, a nitride, or a boride that has one or more kinds of elements selected from group 4a to 6a elements in a periodic table, and having a hardness of from 600 HV to 1,600 HV to oxidation treatment, and which has an oxide mainly including triiron tetraoxide ($Fe_3O_4$) and cobalt oxide (CoO) formed on a surface and in an interior of the iron-based sintered alloy, the valve sheet being characterized in that the iron-based sintered alloy subjected to oxidation treatment has an area ratio of the oxide of from 5% to 25% in a cross section thereof in a state prior to installation on the cylinder head.

The valve seat according to the embodiment of the present invention includes the iron-based sintered alloy subjected to oxidation treatment obtained by subjecting the iron-based sintered alloy including 4 mass % to 15 mass % of the Co particles and the hard particles to oxidation treatment, and hence the Co particles form cobalt oxide (CoO) through the oxidation treatment, resulting in an increase in radial crushing strength, and an improvement in wear resistance by virtue of an action of cobalt oxide (CoO) as a self-lubricant (wear-suppressing action on the valve seat or an associated valve). In addition, the radial crushing strength is increased by the addition effect of the hard particles. In addition, the oxide mainly including triiron tetraoxide ($Fe_3O_4$) and cobalt oxide (CoO) is formed on the surface and in the interior, and hence an oxide is easily formed on an abutment surface with a valve during operation, with the oxide formed in advance on the surface of the valve seat as a starting point. When the oxide is formed on the abutment surface with the valve, metal contact between the valve and the valve seat is suppressed, and the wear resistance of the valve seat is improved. Further, the wear resistance can be improved while the radial crushing strength is maintained by setting the area ratio of the oxide to from 5% to 25% in the cross section of the iron-based sintered alloy subjected to oxidation treatment.

In one embodiment of the present invention, the Co particles preferably have an average particle size of from 10 μm to 40 μm. According to the embodiment, the Co particles exhibit good dispersibility in the iron-based sintered alloy, and variations in wear resistance and radial crushing strength can be suppressed.

In one embodiment of the present invention, the hard particles preferably include Co-based alloy particles each containing 28 mass % to 38 mass % of Co, and the carbide. According to the embodiment, Co oxide is generated from a Co component diffused from the hard particles in the oxidation treatment of the iron-based sintered alloy, and hence the wear resistance and radial crushing strength of the valve seat can be further improved.

In one embodiment of the present invention, the iron-based sintered alloy preferably has an area ratio of the hard particles of from 5% to 45% in the cross section thereof. According to the embodiment, plastic flow of the iron-based sintered alloy is suppressed, and the wear resistance of the valve seat can be further improved.

In one embodiment of the present invention, the iron-based sintered alloy preferably further includes a solid lubricant. In addition, the solid lubricant preferably has an average particle size of from 1 μm to 10 μm. According to the embodiment, the wear resistance of the valve seat can be further improved.

Advantageous Effects of Invention

According to the embodiments of the present invention, the valve seat excellent in radial crushing strength and wear resistance can be provided.

DESCRIPTION OF EMBODIMENTS

A valve seat of the present invention is formed of an iron-based sintered alloy subjected to oxidation treatment, which is obtained by subjecting an iron-based sintered alloy including: Co particles; and hard particles each containing at least one compound of an intermetallic compound, a carbide, a silicide, a nitride, or a boride that has one or more kinds of elements selected from group 4a to 6a elements in a periodic table, and having a hardness of from 600 HV to 1,600 HV to oxidation treatment, and which has an oxide formed mainly of triiron tetraoxide ($Fe_3O_4$) and cobalt oxide (CoO) formed on the surface and in the interior of the iron-based sintered alloy.

In the present invention, the valve seat has an area ratio of the oxide of essentially from 5% to 25%, preferably from 5% to 20%, in the cross section of the iron-based sintered alloy subjected to oxidation treatment in a state prior to installation on a cylinder head. When the area ratio of the oxide falls within the above-mentioned range, the valve seat can exhibit excellent radial crushing strength and excellent wear resistance. When the area ratio of the oxide is more than 25%, the radial crushing strength is reduced, and the valve seat is liable to be broken by the impact when a valve is seated therein. When the area ratio of the oxide is less than 5%, the wear resistance is poor. For adjustment of the area ratio of the oxide to from 5% to 25%, there is given a method involving adjusting an oxidation treatment time period in the oxidation treatment.

It should be noted that, in the present invention, as illustrated in Examples to be described later, an optional cross section of the valve seat (iron-based sintered alloy subjected to the oxidation treatment) is observed with a scanning electron microscope, an oxygen map is obtained from the observed image using an oxygen map of an energy-dispersive X-ray analyzer (EDX), the brightness of the obtained oxygen map data is binarized and the area ratio having a brightness of 5 or more is obtained, and the average value of N=3 locations/item×10 points is used as the area ratio of the oxide formed mainly of triiron tetraoxide ($Fe_3O_4$) and cobalt oxide (CoO).

In the present invention, the content of the Co particles is from 4 mass % to 15 mass %, preferably from 6 mass % to 13 mass %, in the iron-based sintered alloy prior to the oxidation treatment. Cobalt oxide (CoO) is generated through the oxidation treatment of the iron-based sintered alloy including the Co particles. Cobalt oxide (CoO) generated acts as a self-lubricant, and can suppress wear between the valve seat and an associated valve. In consequence, the wear resistance of the valve seat is improved. In addition, also the radial crushing strength of the valve seat is improved. When the content of the Co particles is less than 4 mass %, the radial crushing strength and wear resistance of the valve seat tend to be insufficient. Although the radial crushing strength and wear resistance are improved by increasing the content of the Co particles, a content of more than 15 mass % allows the valve seat to be excessively hard, and wear of the associated valve tends to be increased. In addition, such content induces high cost.

The purity of the Co particles (Co content) is preferably 99 mass % or more.

In the present invention, the iron-based sintered alloy prior to the oxidation treatment has an area ratio of the hard particles of preferably from 5% to 45%, more preferably from 15% to 40%, in the cross section thereof. When the iron-based sintered alloy includes the hard particles, plastic flow of the valve seat can be suppressed, and the wear resistance can be further improved. When the area ratio of the hard particles is more than 45%, productivity is poor. Further, the density of the iron-based sintered alloy tends to be reduced, resulting in a reduction in radial crushing strength. When the area ratio of the hard particles is less than 5%, the addition effect of the hard particles may not be obtained sufficiently.

It should be noted that, in the present invention, as illustrated in Examples to be described later, an optional cross section of the iron-based sintered alloy prior to the oxidation treatment is observed at 200 times using an optical microscope or an electron microscope, hard particle portions in the cross-sectional structural photograph in a range of 1 mm×1 mm are traced on a spreadsheet and the area is obtained, and the average value of the measured values in 4 locations is used as the area ratio of the hard particles.

In the present invention, the content of the hard particles is preferably from 5 mass % to 45 mass %, more preferably from 15 mass % to 40 mass %, in the iron-based sintered alloy prior to the oxidation treatment. The area ratio of the hard particles in the cross section of the iron-based sintered alloy can be increased by increasing the content of the hard particles. When the content of the hard particles is set to from 5 mass % to 45 mass %, the area ratio of the hard particles in the cross section of the iron-based sintered alloy can be set to from 5% to 45%.

In the present invention, the hard particles each have a hardness of preferably from 600 HV to 1,600 HV, more preferably from 650 HV to 1,400 HV. When the hard particles each have a hardness of less than 600 HV, the wear resistance of the valve seat tends to be insufficient. When the hard particles each have a hardness of more than 1,600 HV, wear of the associated valve tends to be increased. It should be noted that, in the present invention, the hardness of the hard particles means a value obtained through measurement based on JIS Z 2244 "Vickers hardness test-Test method."

Specific examples of the hard particles include: intermetallic compound particles of Fe—Mo (ferromolybdenum), Fe—Cr (ferrochromium), Co—Mo—Cr and the like; Fe-based alloy particles each obtained by dispersing one or more kinds selected from carbides, silicides, nitrides, and borides of Cr, Mo and the like; Co-based alloy particles each obtained by dispersing one or more kinds selected from carbides, silicides, nitrides, and borides of Cr, Mo and the like; and Ni-based alloy particles each obtained by dispersing one or more kinds selected from carbides, silicides, nitrides, and borides of Cr, Mo and the like. Of those, Co-based alloy particles each containing 28 mass % to 38 mass % of Co, and a carbide are preferably used. When the Co-based alloy particles are used as the hard particles, Co oxide is generated from a Co component diffused from the hard particles in the oxidation treatment of the iron-based sintered alloy. Therefore, an effect as a self-lubricant is easily exhibited, and the wear resistance is improved. Further, the radial crushing strength can be further increased. In the case of using the Co-based alloy particles as the hard particles, the Co content (the total content of the Co particles and Co in the hard particles) in the valve seat is preferably from 5 mass % to 32 mass %, more preferably from 10 mass % to 28 mass %.

The valve seat of the present invention may further contain a solid lubricant. The wear resistance of the valve seat is improved by incorporating the solid lubricant. The solid lubricant is not particularly limited. Examples of thereof include calcium fluoride, manganese sulfide, molybdenum sulfide, tungsten sulfide, chromium sulfide, enstatite, talc, boron nitride and the like.

The content of the solid lubricant in the valve seat is preferably from 0 mass % to 5 mass %, more preferably from 0 mass % to 3 mass %. When the content of the solid lubricant increases, the radial crushing strength tends to be reduced, and hence the upper limit is preferably 5 mass %.

In the present invention, the valve seat may further contain any other addition element other than Co, the hard particles, and the solid lubricant. Examples of the other addition element include C, Cu, Ni, Cr, Mo, P, Mn and the like.

The valve seat of the present invention is excellent in radial crushing strength and wear resistance, and hence can be preferably used as a valve seat to be installed on an abutment surface of a cylinder head with a valve in an internal combustion engine such as a gas engine or an alcohol engine.

The valve seat of the present invention may be formed only of the iron-based sintered alloy subjected to oxidation treatment. Alternatively, the valve seat of the present invention may be a laminate with another material, in which a portion corresponding to the abutment surface with the valve is formed of the iron-based sintered alloy subjected to oxidation treatment and a portion corresponding to a seat on the cylinder head side is formed of an inexpensive iron-based sintered alloy heretofore used. Such laminate can realize a reduction in material cost.

A manufacturing method for the valve seat of the present invention is not particularly limited, and the valve seat may be manufactured by, for example, the following method.

First, as raw materials for the iron-based sintered alloy, the Co particles, the hard particles, and the other addition element, the solid lubricant, and the like as optional components are added to raw-material iron powder such as pure iron powder, Cr steel powder, Mn steel powder, MnCr steel powder, CrMo steel powder, NiCr steel powder, NiCrMo steel powder, tool steel powder, high-speed steel powder, Co alloy steel powder, Ni steel powder or the like, and the resultant is mixed.

The ratio in which the raw materials are mixed is not particularly limited. An example thereof is 35 mass % to 91 mass % of the raw material iron powder, 5 mass % to 45 mass % of the hard particles, 4 mass % to 15 mass % of the Co particles, and 0 mass % to 5 mass % of the solid lubricant. The area ratio of the hard particles in a cross section of the iron-based sintered alloy can be increased by increasing the mixing ratio of the hard particles. For example, the area ratio of the hard particles in a cross section of the iron-based sintered alloy can be adjusted to from 5% to 45% by adjusting the mixing ratio of the hard particles to from 5 mass % to 45 mass %.

The raw material iron powder preferably has an average particle size of from 40 μm to 150 μm. When the raw material iron powder has an average particle size of less than 40 μm, the density of a green compact is liable to vary owing to a reduction in fluidity, resulting in variations in radial crushing strength of the valve seat. When the raw material iron powder has an average particle size of more than 150 μm, the density of the green compact is liable to be reduced owing to larger gaps between powder particles, resulting in a reduction in radial crushing strength of the valve seat. It should be noted that, in the present invention, a value of the average particle size means a value obtained through measurement with a laser diffraction/scattering particle size distribution analyzer.

The hard particles preferably have an average particle size of from 20 μm to 70 μm. When the hard particles have an average particle size of less than 20 μm, the wear resistance of the valve seat is liable to be reduced. When the hard particles have an average particle size of more than 70 μm, the hard particles are liable to be sparse in the iron-based sintered alloy, and their homogeneous dispersion is difficult. As a result, the wear resistance of the valve seat is liable to vary.

The Co particles preferably have an average particle size of from 10 μm to 40 μm. When the Co particles have an average particle size of less than 10 μm, Co aggregates and is hard to homogeneously disperse in the iron-based sintered alloy, and the wear resistance of the valve seat is liable to vary. When the Co particles have an average particle size of more than 40 μm, Co is liable to be sparse in the iron-based sintered alloy and is hard to homogeneously disperse therein, and the wear resistance of the valve seat is liable to vary.

The solid lubricant preferably has an average particle size of from 1 µm to 10 µm. When the solid lubricant has an average particle size of less than 1 µm, the solid lubricant aggregates and is hard to homogeneously disperse in the iron-based sintered alloy, and the wear resistance of the valve seat is liable to vary. When the solid lubricant has an average particle size of more than 10 µm, compressibility is liable to be impaired during molding, resulting in a reduction in density of the green compact. As a result, the radial crushing strength of the valve seat is liable to be reduced.

The other addition element may be added in a form of, for example, an oxide, a carbonate, a single element, or an alloy.

Next, the raw material powder mixture is filled into a mold and subjected to compression molding using a molding press to prepare a green compact.

Next, the green compact is sintered to produce a sintered compact (iron-based sintered alloy). Preferred sintering conditions are as follows: a temperature of from 1,050° C. to 1,200° C. and a time period of from 0.2 hour to 1.5 hours.

Next, the iron-based sintered alloy is subjected to oxidation treatment. The oxidation treatment is preferably steam treatment from the viewpoint of stability of an oxidizing atmosphere. However, the oxidation treatment is not particularly limited as long as triiron tetraoxide ($Fe_3O_4$) and cobalt oxide (CoO) can be formed on the surface and in the interior of the iron-based sintered alloy, and for example, a method involving oxidation in an oxidizing atmosphere in a heating furnace may be adopted.

In the present invention, the oxidation treatment is performed so that the area ratio of the oxide including triiron tetraoxide ($Fe_3O_4$) and cobalt oxide (CoO) is from 5% to 25% in the cross section of the iron-based sintered alloy. A longer oxidation treatment time period increases the area ratio of the oxide, and a shorter oxidation treatment time period reduces the area ratio of the oxide. The oxidation treatment time period may be appropriately adjusted so that the area ratio of the oxide is from 5% to 25%. When the oxidation treatment is described by way of a specific example, the area ratio of the oxide can be set to from 5% to 25% through steam treatment at from 500° C. to 600° C. for from 0.2 hour to 5 hours.

Next, the iron-based sintered alloy subjected to oxidation treatment is polished and scraped to obtain a valve seat.

EXAMPLES

<Measurement Methods>

Measurement of Area Ratio of Oxide

A portion of the cross section of the valve seat was extracted with a scanning electron microscope, and an oxygen map of an energy-dispersive X-ray analyzer (EDX) was used for measurement by the following procedure.

(1) The cut valve seat was embedded in a resin, and the sample was polished using diamond grain.

(2) The scanning electron microscope used was "VE8800" (trade name, product of Keyence), and observation was performed at 500 times with an accelerated voltage of 15 kV.

(3) The EDX used was "INCA 250 XTK" (trade name, product of Oxford Instruments), and the EDX software used was "The Microanalysis Suite-Issue 18d, version 4.15" (product of Oxford Instruments).

(4) The electron microscopic image was taken into the EDX software at an image resolution of 512×384 pixels.

(5) X-ray collection was integrated 10 times, setting the process time scale setting to 6, the spectral range to 0 keV to 20 keV, the number of channels to 2 k, adjusting the collection count rate to 30% dead time, and the dwell time being 100 µs/pixel.

(6) Processing to join 2×2 pixels into 1 pixel was performed and the X-ray intensity was set to 4 times in order to enhance the contrast of the obtained oxygen map.

(7) After the processing in (6), the brightness of the oxygen map data was binarized and the area ratio having a brightness of 5 or more was obtained using the area calculating function of the EDX software, and the average value of N=3 locations/item×10 points was used as the area ratio of the oxide.

Measurement of Area Ratio of Hard Particles

A cross section of the iron-based sintered alloy was observed at 200 times using an optical microscope or an electron microscope, hard particle portions in the cross-sectional structural photograph in a range of 1 mm×1 mm were traced on a spreadsheet and the area was obtained, and the average value of the measured values in 4 locations was used as the area ratio of the hard particles.

Wear Resistance Test

Figure 12:
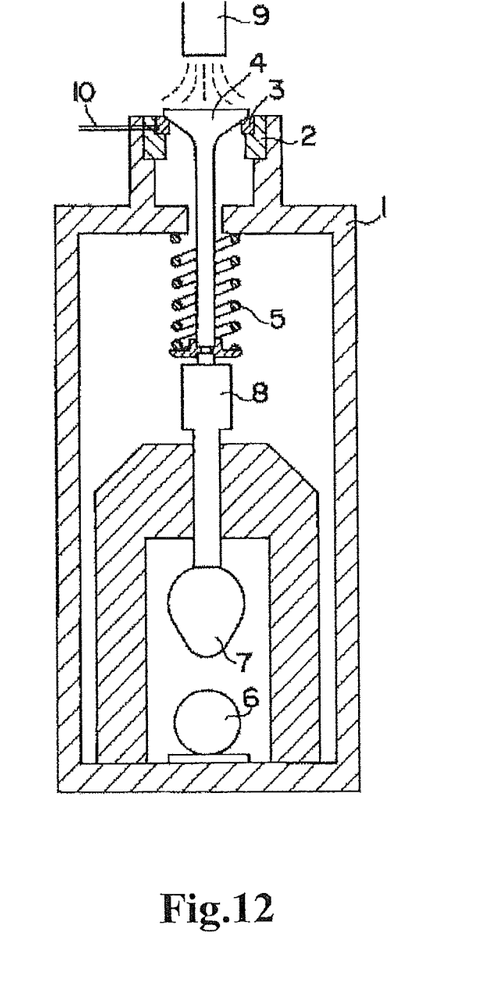
FIG. 12 is a schematic diagram of a valve seat wear test device.

A valve seat 3 was mounted to a valve seat wear test device illustrated in FIG. 12. Specifically, this valve seat wear test device is configured such that the face surface of a valve 4 is brought by a spring 5 into abutment with the valve seat 3 fitted into a seat holder 2 on the upper end part of a frame 1. The valve 4 is lifted upward via a rod 8 by a cam shaft 7 rotated by an electric motor 6 and then returned by the spring 5, thus being brought into abutment with the valve seat 3. The valve 4 is heated with a gas burner 9, the temperature of the valve seat 3 is measured with a thermocouple 10, and the temperature is controlled. During heating of the valve 4, the combustion state of the gas burner is set to complete combustion so as to prevent an oxide film from being formed on the surface. It should be noted that actual engine parts were used for the valve 4, the spring 5, the cam shaft 7, and the like. The wear test was performed with the conditions shown in Table 1.

TABLE 1

| Material for valve 4 | SUH35 |
|---|---|
| Set load | 280 N |
| Atmosphere | Low-oxygen atmosphere (nitrogen gas injected) |
| Offset between valve 4 and valve seat 3 | 0.2 mm |
| Temperature | 300° C. |
| Cam shaft rotation speed | 3,500 rpm |
| Time | 1.5 hours |

Radial Crushing Strength Test

Measurement was performed based on JIS Z 2507 "Method of testing radial crushing strength of sintered oil-containing bearings."

Measurement of Hardness

Measurement was performed based on JIS Z 2245 "Rockwell hardness test—test method."

Measurement of Density

Measurement was performed based on JIS Z 2501 "Sintered metal materials—methods of testing of density, oil content, and open porosity."

Test Example 1

Figure 1:
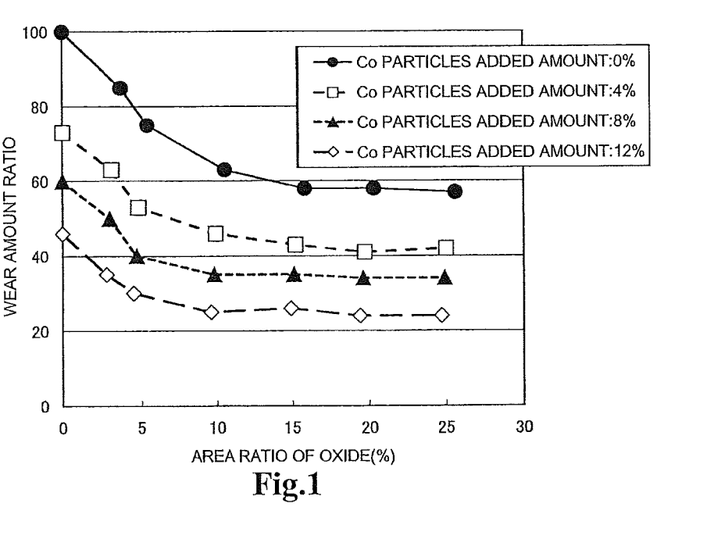
FIG. 1 is a graph for showing results of a wear resistance test on valve seats obtained by subjecting iron-based sintered alloys of Compositions 1-1 to 1-4 to oxidation treatment.
Figure 2:
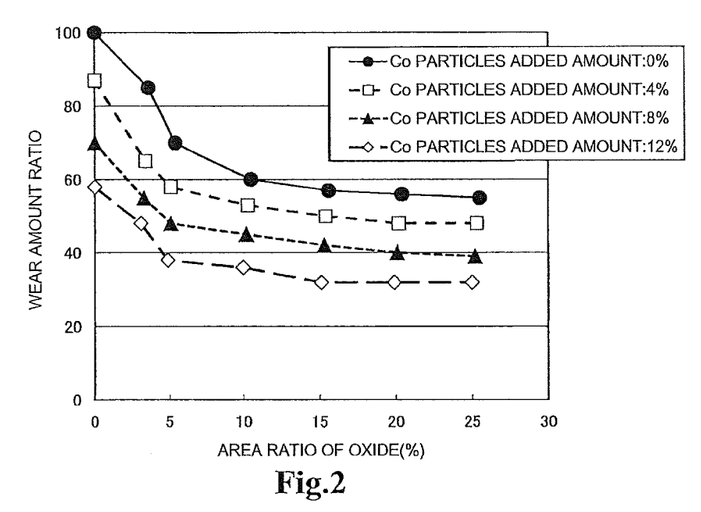
FIG. 2 is a graph for showing results of a wear resistance test on valve seats obtained by subjecting iron-based sintered alloys of Compositions 2-1 to 2-4 to oxidation treatment.

Fe powder, hard particles (Co-based alloy particles), Co particles, and a solid lubricant (manganese sulfide) were mixed at ratios shown in Tables 2 and 3 and filled into a mold, and then subjected to compression molding using a molding press. The obtained green compact was sintered at 1,120° C. for 0.5 hour, to yield an iron-based sintered alloy.

of the wear resistance test on the valve seats obtained by subjecting the iron-based sintered alloys of Compositions 1-1 to 1-4 to the oxidation treatment. FIG. 2 is a graph for

TABLE 2

|  | Composition 1-1 | Composition 1-2 | Composition 1-3 | Composition 1-4 |
|---|---|---|---|---|
| Co particles (mass %) (average particle size: 20 μm, purity: 99%) | 0 | 4 | 8 | 12 |
| Fe powder (average particle size: 80 μm) | Balance | Balance | Balance | Balance |
| Hard particles (mass %) (composition: Co-Mo-Cr, average particle size: 35 μm, hardness: 750 HV) | 5 | 5 | 5 | 5 |
| Solid lubricant (mass %) (MnS, average particle size: 5 μm) | 2 | 2 | 2 | 2 |
| Area ratio of hard particles (%) | 5 | 5 | 5 | 5 |
| Hardness of iron-based sintered alloy prior to oxidation treatment (HRB) | 88-93 | 87-92 | 85-90 | 82-88 |
| Area ratio of oxide in valve seat after oxidation treatment (%) | 0-25 | 0-25 | 0-25 | 0-25 |
| Hardness of valve seat after oxidation treatment (HRC) | 24-31 | 21-29 | 18-26 | 15-22 |
| Density of valve seat after oxidation treatment (g/cm$^2$) | 6.6-6.8 | 6.6-6.8 | 6.6-6.8 | 6.6-6.8 |

TABLE 3

|  | Composition 2-1 | Composition 2-2 | Composition 2-3 | Composition 2-4 |
|---|---|---|---|---|
| Co particles (mass %) (average particle size: 20 μm, purity: 99%) | 0 | 4 | 8 | 12 |
| Fe powder (average particle size: 80 μm) | Balance | Balance | Balance | Balance |
| Hard particles (mass %) (composition: Co-Mo-Cr, average particle size: 35 μm, hardness: 750 HV) | 45 | 45 | 45 | 45 |
| Solid lubricant (mass %) (MnS, average particle size: 5 μm) | 2 | 2 | 2 | 2 |
| Area ratio of hard particles (%) | 45 | 45 | 45 | 45 |
| Hardness of iron-based sintered alloy prior to oxidation treatment (HRB) | 97-103 | 96-101 | 94-100 | 91-97 |
| Area ratio of oxide in valve seat after oxidation treatment (%) | 0-25 | 0-25 | 0-25 | 0-25 |
| Hardness of valve seat after oxidation treatment (HRC) | 26-33 | 23-30 | 20-28 | 17-25 |
| Density of valve seat after oxidation treatment (g/cm$^2$) | 6.8-7.0 | 6.8-7.0 | 6.8-7.0 | 6.8-7.0 |

Next, the iron-based sintered alloys were subjected to oxidation treatment as follows: steam treatment was performed thereon while the conditions were changed within ranges of a temperature of from 500° C. to 600° C. and a treatment time period of from 0.2 hour to 5 hours. Thus, oxides formed mainly of triiron tetraoxide ($Fe_3O_4$) and cobalt oxide (CoO) were generated on the surface and in the interior of the iron-based sintered alloys with various area ratios. As a result, valve seats (iron-based sintered alloys subjected to oxidation treatment) having an area ratio of the oxide of 0%, 3%, 5%, 10%, 15%, 20%, and 25% were obtained.

Figure 3:
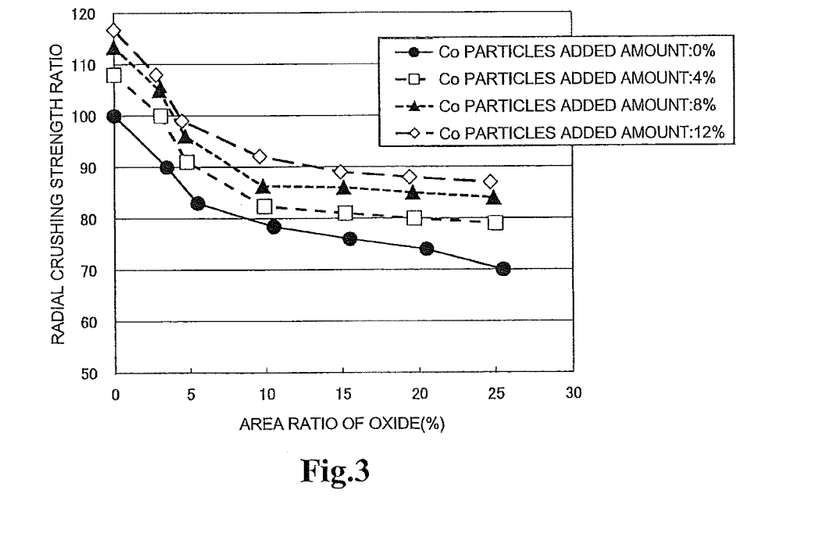
FIG. 3 is a graph for showing results of a radial crushing strength test on the valve seats obtained by subjecting the iron-based sintered alloys of Compositions 1-1 to 1-4 to oxidation treatment.
Figure 4:
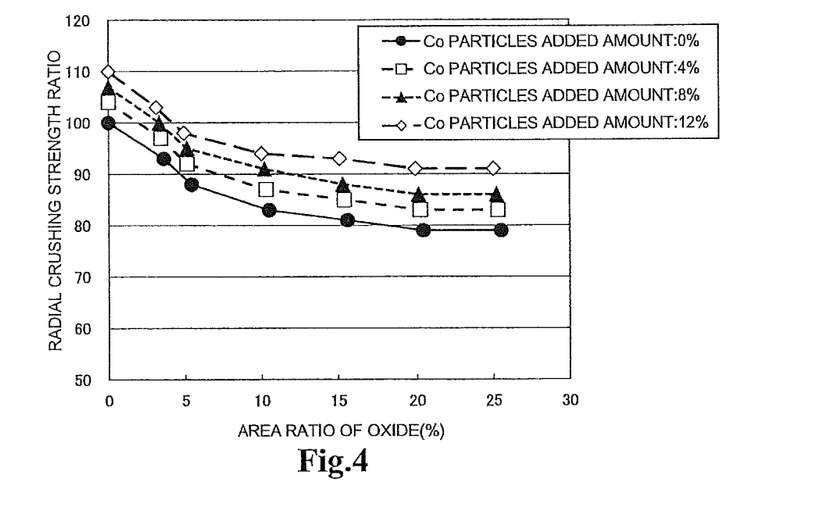
FIG. 4 is a graph for showing results of a radial crushing strength test on the valve seats obtained by subjecting the iron-based sintered alloys of Compositions 2-1 to 2-4 to oxidation treatment.

The valve seats were each subjected to the wear resistance test and radial crushing strength test. The results are shown in FIG. 1 to FIG. 4. FIG. 1 is a graph for showing the results showing the results of the wear resistance test on the valve seats obtained by subjecting the iron-based sintered alloys of Compositions 2-1 to 2-4 to the oxidation treatment. FIG. 3 is a graph for showing the results of the radial crushing strength test on the valve seats obtained by subjecting the iron-based sintered alloys of Compositions 1-1 to 1-4 to the oxidation treatment. FIG. 4 is a graph for showing the results of the radial crushing strength test on the valve seats obtained by subjecting the iron-based sintered alloys of Compositions 2-1 to 2-4 to the oxidation treatment. It should be noted that a wear amount ratio was represented as a relative value when the wear amount of an iron-based sintered alloy having an added amount of the Co particles of 0 mass % and not having been subjected to the oxidation treatment was defined as 100. In addition, a radial crushing strength ratio was represented as a relative value when the radial crushing strength of the iron-based sintered alloy having an added amount of the Co particles of 0 mass % and not having been subjected to the oxidation treatment was defined as 100.

As is apparent from FIG. 1 to FIG. 4, the wear resistance and radial crushing strength were improved as the area ratio of the oxide was increased. It is revealed that the effect is remarkably increased at an area ratio of the oxide of 5% or more, but less increased at an area ratio of the oxide of more than 20%. In addition, the wear resistance and radial crushing strength were improved by adding the Co particles to the iron-based sintered alloy.

Test Example 2

Fe powder, hard particles (Co-based alloy particles), Co particles, and a solid lubricant (manganese sulfide) were mixed at ratios shown in Table 4 and filled into a mold, and then subjected to compression molding using a molding press. The obtained green compact was sintered at 1,120° C. for 0.5 hour, to yield an iron-based sintered alloy.

TABLE 4

|  | Composition 3-1 | Composition 3-2 | Composition 3-3 | Composition 3-4 |
|---|---|---|---|---|
| Co particles (mass %) (average particle size: 20 μm, purity: 99%) | 0 | 4 | 8 | 12 |
| Fe powder (average particle size: 80 μm) | Balance | Balance | Balance | Balance |
| Hard particles (mass %) (composition: Co-Mo-Cr, average particle size: 35 μm, hardness: 750 HV) | 25 | 25 | 25 | 25 |
| Solid lubricant (mass %) (MnS, average particle size: 5 μm) | 2 | 2 | 2 | 2 |
| Area ratio of hard particles (%) | 25 | 25 | 25 | 25 |
| Hardness of iron-based sintered alloy prior to oxidation treatment (HRB) | 98-103 | 97-102 | 95-100 | 92-98 |
| Area ratio of oxide in valve seat after oxidation treatment (%) | 10.5 | 10.1 | 10 | 9.8 |
| Hardness of valve seat after oxidation treatment (HRC) | 41-47 | 39-45 | 36-43 | 31-39 |
| Density of valve seat after oxidation treatment (g/cm$^2$) | 6.8-7.0 | 6.8-7.0 | 6.8-7.0 | 6.8-7.0 |

Next, the iron-based sintered alloys were subjected to oxidation treatment as follows: steam treatment was performed thereon at 550° C. for a treatment time period of 1 hour. Thus, oxides formed mainly of triiron tetraoxide ($Fe_3O_4$) and cobalt oxide (CoO) were generated on the surface and in the interior of the iron-based sintered alloys so that the area ratio was about 10%. As a result, valve seats (iron-based sintered alloys subjected to oxidation treatment) were obtained.

Figure 5:
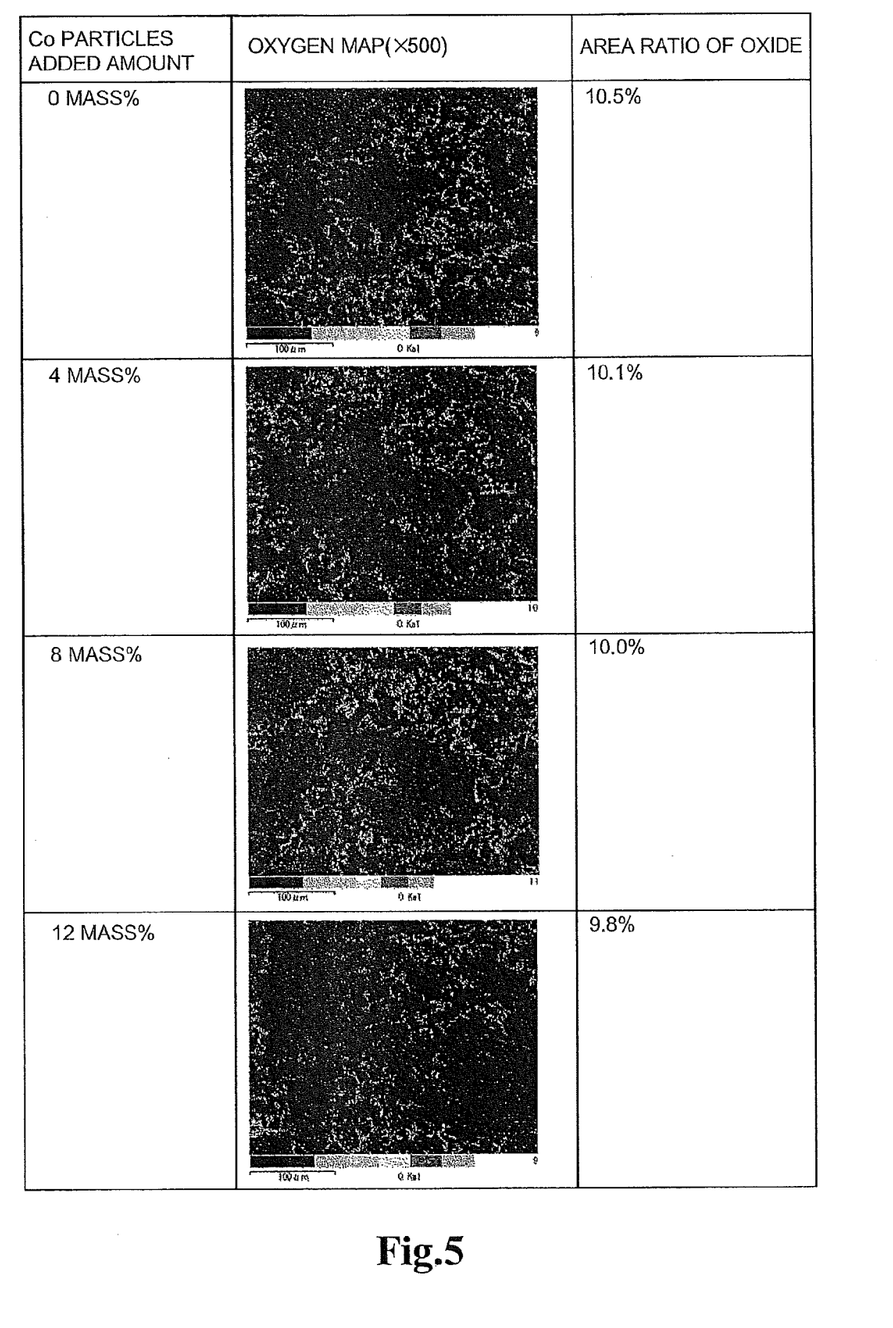
FIG. 5 is oxygen maps of valve seats of Test Example 2.
Figure 6:
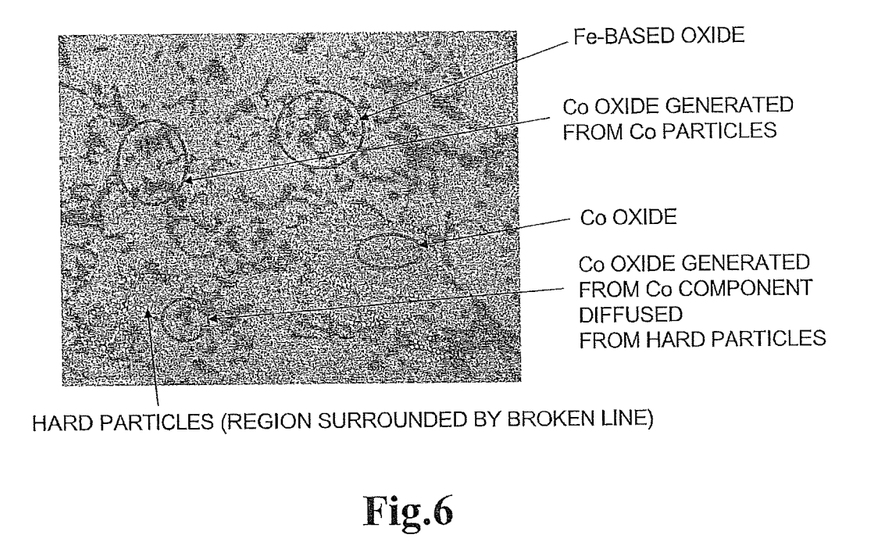
FIG. 6 is a structural photograph (500 times) of the valve seat of Composition 3-3 with a metallographic microscope.
Figure 7:
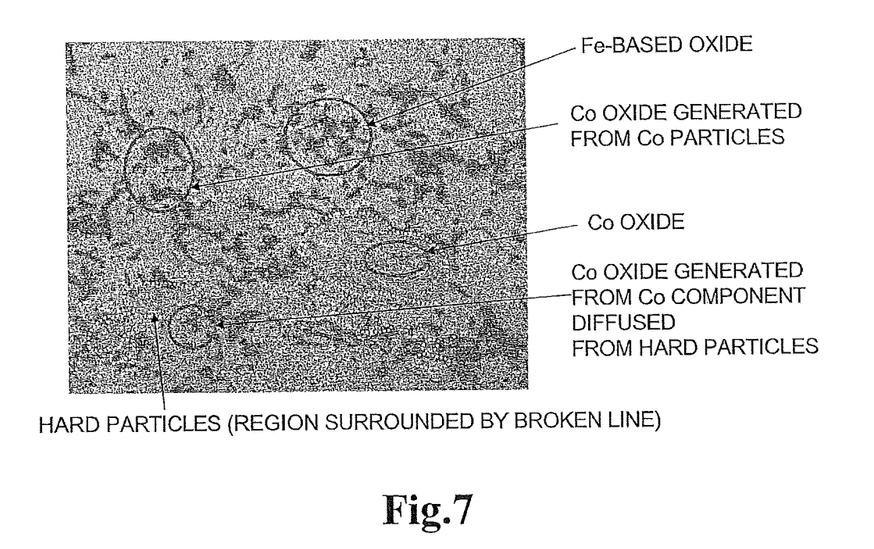
FIG. 7 is a structural photograph (500 times) of the same valve seat with a scanning electron microscope.
Figure 8:
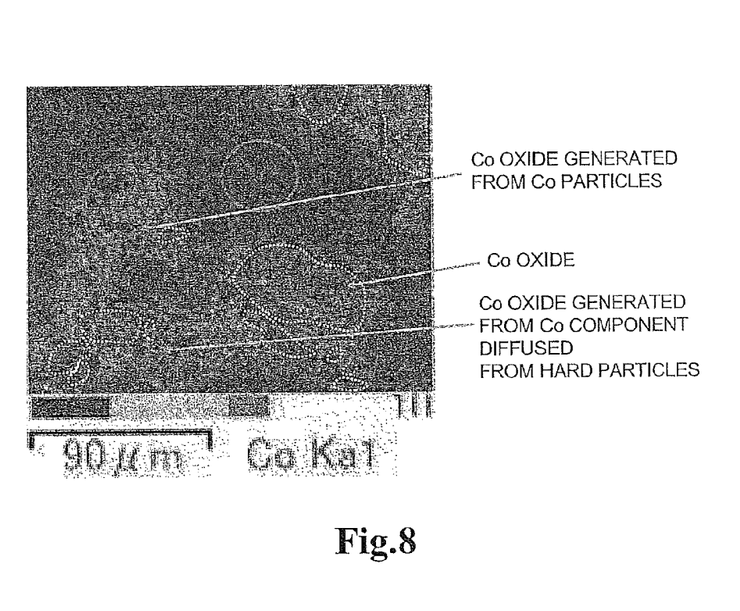
FIG. 8 is a Co map of the same valve seat with an energy-dispersive X-ray analyzer (EDX), which corresponds to the structural photograph of FIG. 7.
Figure 9:
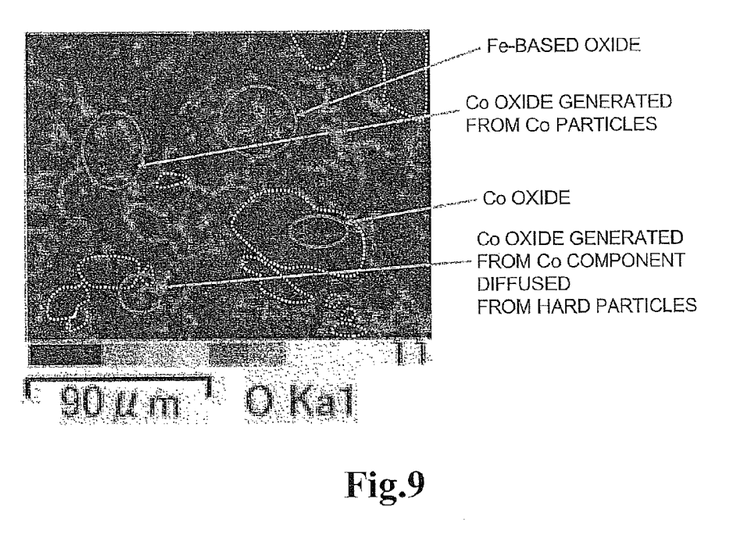
FIG. 9 is an O map of the same valve seat with an energy-dispersive X-ray analyzer (EDX), which corresponds to the structural photograph of FIG. 7.
Figure 10:
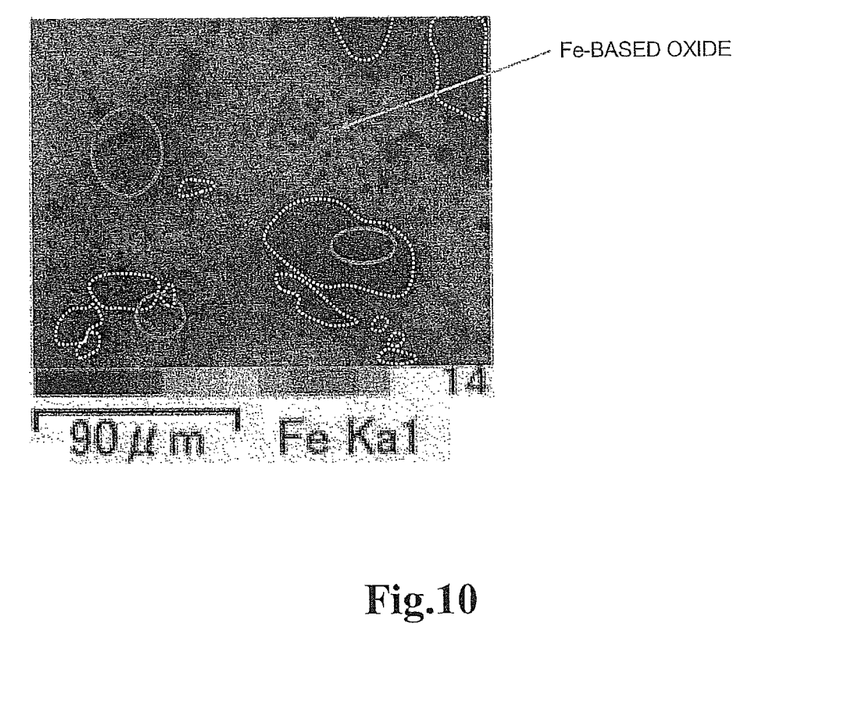
FIG. 10 is an Fe map of the same valve seat with an energy-dispersive X-ray analyzer (EDX), which corresponds to the structural photograph of FIG. 7.

FIG. 5 is oxygen maps of the valve seats. FIG. 6 is a structural photograph (500 times) of the valve seat of Composition 3-3 (added amount of Co particles: 8 mass %) with a metallographic microscope. FIG. 7 is a structural photograph (500 times) of the same valve seat with the scanning electron microscope. FIG. 8 to FIG. 10 are respectively a Co map, an O map, and an Fe map of the same valve seat with the energy-dispersive X-ray analyzer (EDX), which correspond to the structural photograph of FIG. 7. In FIG. 6 to FIG. 10, regions in which Co oxide and an Fe-based oxide were present were surrounded by solid lines, and a region in which the hard particles were present was surrounded by a broken line.

As is apparent from FIG. 6 to FIG. 10, an oxide (CoO) is generated from the Co particles added to the iron-based sintered alloy through the oxidation treatment. In addition, it is revealed that an oxide (CoO) is generated also from a Co component diffused from the hard particles (Co—Mo—Cr).

Figure 11:
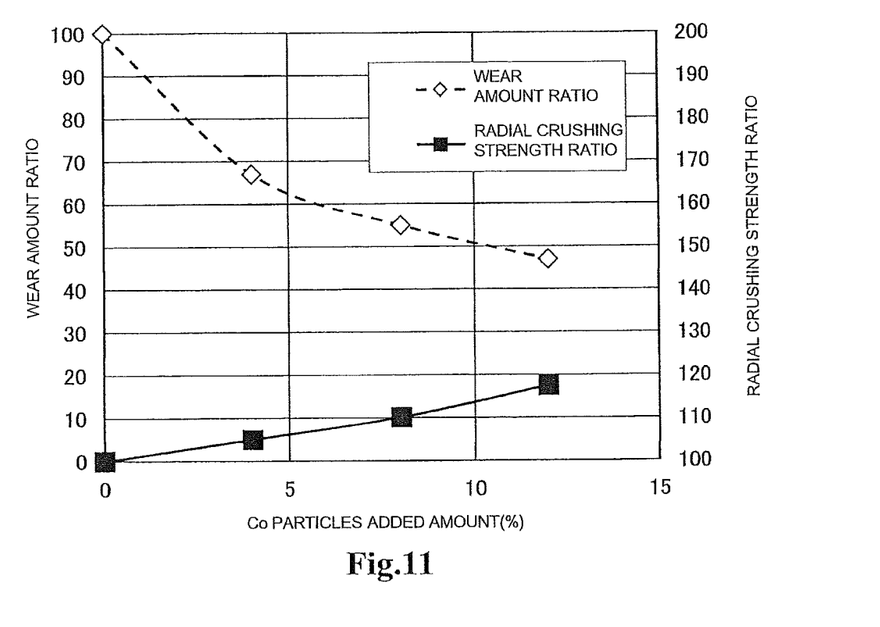
FIG. 11 is a graph for showing results of a wear resistance test and a radial crushing strength test on the valve seats of Test Example 2.

In addition, the obtained valve seats were subjected to the wear resistance test and radial crushing strength test. The results are shown in FIG. 11. It should be noted that a wear amount ratio was represented as a relative value when the wear amount in the case of Composition 3-1 (added amount of Co particles: 0 mass %) was defined as 100. In addition, a radial crushing strength ratio was represented as a relative value when the radial crushing strength in the case of Composition 3-1 (added amount of Co particles: 0 mass %) was defined as 100.

As is apparent from FIG. 11, the wear resistance and radial crushing strength were improved by increasing the added amount of the Co particles.

The invention claimed is:

1. A manufacturing method for a valve seat to be installed on a cylinder head of an internal combustion engine, the manufacturing method comprising subjecting an iron-based sintered alloy comprising: 4 mass % to 15 mass % of Co particles each having a Co component purity of 99 mass % or more; and 5 mass % to 45 mass % of hard particles each having a hardness of from 600 HV to 1,600 HV and comprising Co-based alloy particles to oxidation treatment, to thereby manufacture a valve seat comprising an iron-based sintered alloy subjected to oxidation treatment, which has an oxide mainly comprising triiron tetraoxide ($Fe_3O_4$) and cobalt oxide (CoO) formed on a surface or in an interior of the iron-based sintered alloy, and which has an area ratio of the oxide of from 5% to 25% in a cross section thereof in a state prior to installation on the cylinder head.

2. A manufacturing method for a valve seat according to claim 1, wherein the Co particles have an average particle size of from 10 μm to 40 μm.

3. A manufacturing method for a valve seat according to claim 1, wherein the Co-based alloy particles each contain 28 mass % to 38 mass % of Co, and the carbide.

4. A manufacturing method for a valve seat according to claim 1, wherein the iron-based sintered alloy has an area ratio of the hard particles of from 5% to 45% in a cross section thereof.

5. A manufacturing method for a valve seat according to claim 1, wherein the iron-based sintered alloy further comprises a solid lubricant.

6. A manufacturing method for a valve seat according to claim 5, wherein the solid lubricant has an average particle size of from 1 μm to 10 μm.

* * * * *